United States Patent
Gammel et al.

(10) Patent No.: US 7,979,482 B2
(45) Date of Patent: *Jul. 12, 2011

(54) RANDOM NUMBER GENERATOR CONFIGURED TO COMBINE STATES OF MEMORY CELLS

(75) Inventors: Berndt Gammel, Markt Schwaben (DE); Rainer Goettfert, Munich (DE)

(73) Assignee: Infineon Technologies AG (DE)

( * ) Notice: Subject to any disclaimer, the term of this patent is extended or adjusted under 35 U.S.C. 154(b) by 1881 days.
This patent is subject to a terminal disclaimer.

(21) Appl. No.: 11/084,725

(22) Filed: Mar. 18, 2005

(65) Prior Publication Data
US 2005/0207207 A1    Sep. 22, 2005

(30) Foreign Application Priority Data

Mar. 18, 2004   (DE) .................... 10 2004 013 480

(51) Int. Cl.
*G06F 7/58*   (2006.01)

(52) U.S. Cl. ........ 708/252; 708/250; 708/253; 708/256; 380/46; 380/30; 375/377; 365/149; 364/717; 331/78

(58) Field of Classification Search .......... 380/46
See application file for complete search history.

(56) References Cited

U.S. PATENT DOCUMENTS

| | | | |
|---|---|---|---|
| 5,323,338 A * | 6/1994 | Hawthorne ................ | 708/250 |
| 5,365,585 A | 11/1994 | Puhl et al. | |
| 6,763,363 B1 * | 7/2004 | Driscoll .................. | 708/252 |
| 7,480,687 B2 * | 1/2009 | Dirscherl et al. ......... | 708/252 |
| 2002/0169968 A1 * | 11/2002 | Gammel et al. ........... | 713/189 |
| 2003/0204541 A1 * | 10/2003 | Shackleford et al. ...... | 708/250 |
| 2004/0052375 A1 * | 3/2004 | Craft et al. ............. | 380/256 |
| 2005/0097153 A1 * | 5/2005 | Dirscherl et al. ........ | 708/250 |

FOREIGN PATENT DOCUMENTS

| | | |
|---|---|---|
| DE | 246 663 A1 | 6/1987 |
| DE | 44 09 341 A1 | 9/1995 |
| DE | 102 12 605 A1 | 10/2003 |
| EP | 291405 A2 * | 11/1988 |
| JP | 4-250713 A | 9/1992 |
| JP | 11-4144 A | 1/1999 |
| JP | 11-46142 A | 2/1999 |
| WO | WO-01/48594 A2 | 7/2001 |

* cited by examiner

*Primary Examiner* — Syed A. Zia
*Assistant Examiner* — Bryan Wright
(74) *Attorney, Agent, or Firm* — Dickstein Shapiro LLP

(57) ABSTRACT

A random number generator includes a plurality of memory cells arranged in a series, a feedback processor for generating a feedback signal and for feeding the feedback signal into one of the memory cells, and a random number outputter formed to combine states of a group of at least two memory cells to obtain an output sequence. Sequences strongly differing from one another, the number of which is greater than the number of memory cells, can be generated by generating several output sequences $AF_0, AF_1, AF_2, \ldots, AF_k$ by combining states of different memory cells such that a safe and efficient bus encryption is achievable.

17 Claims, 11 Drawing Sheets

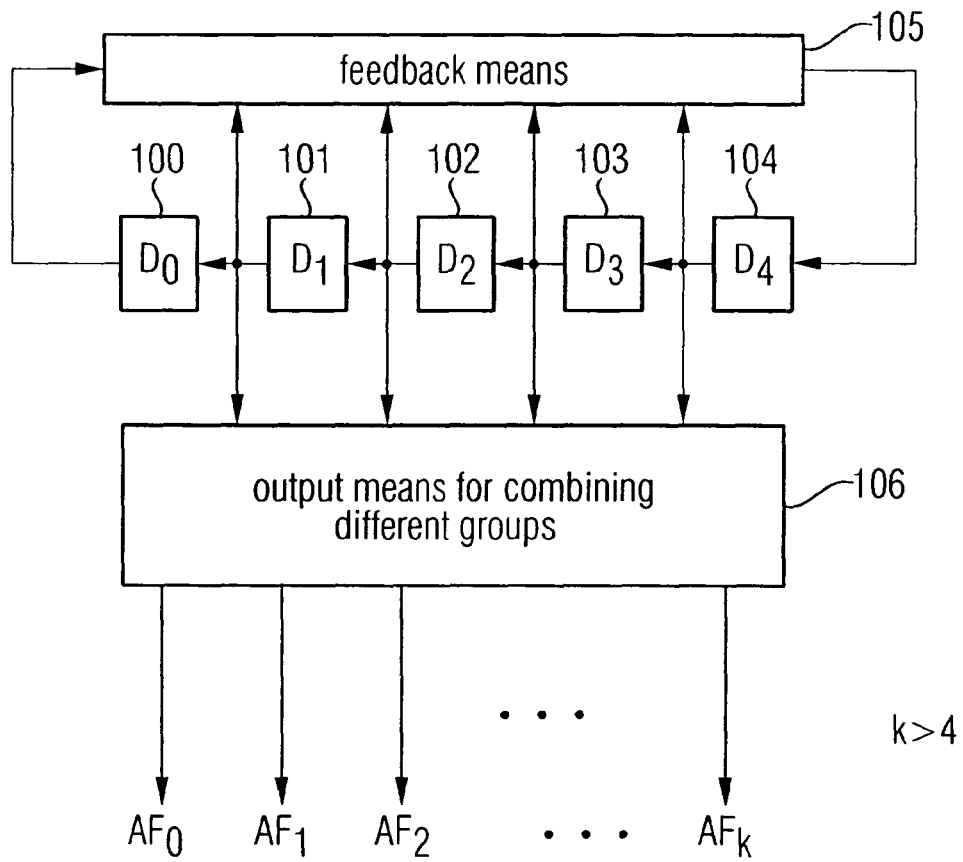
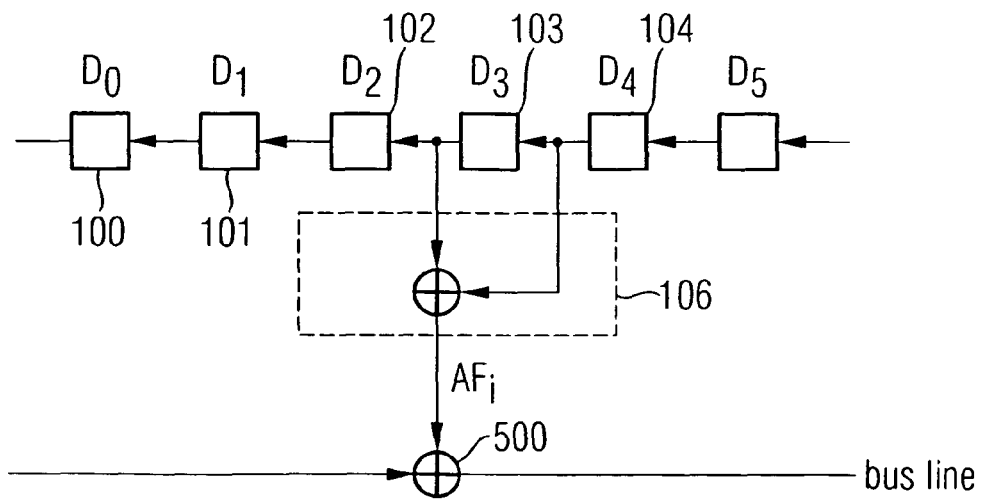

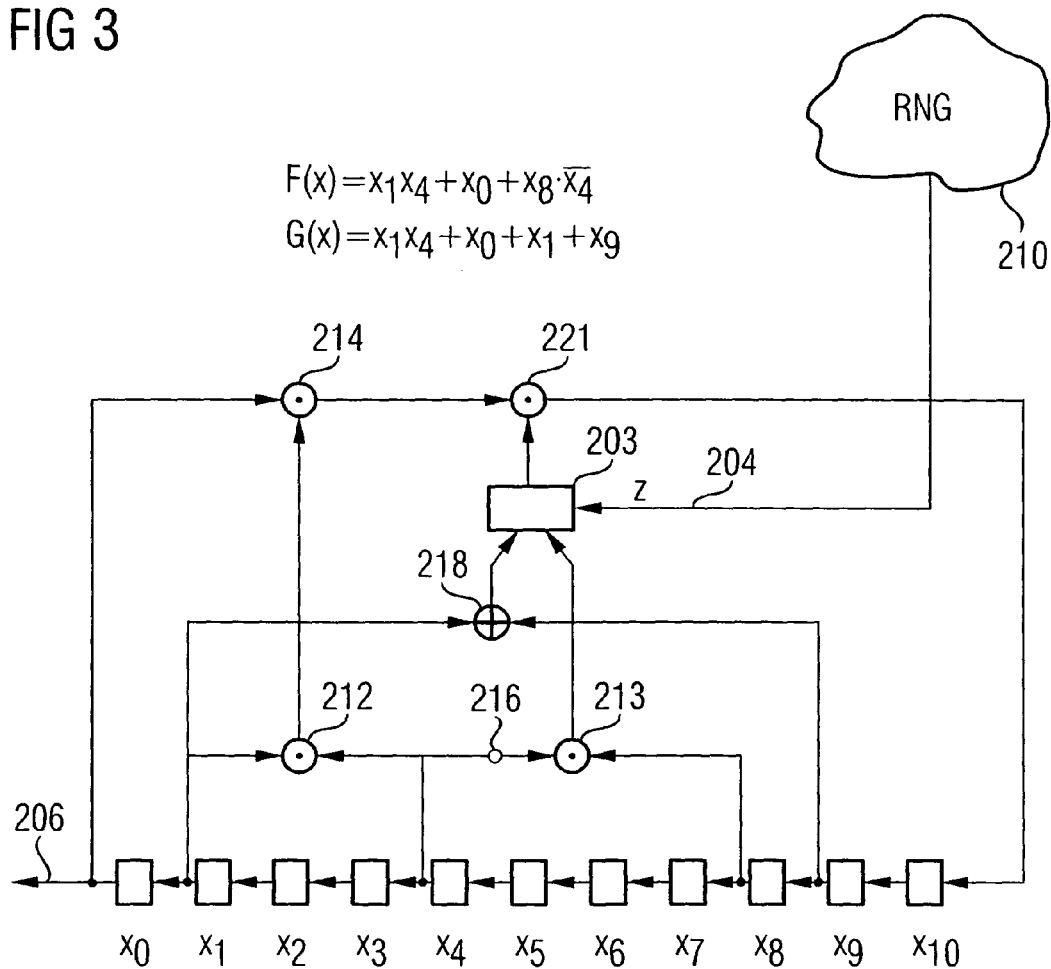

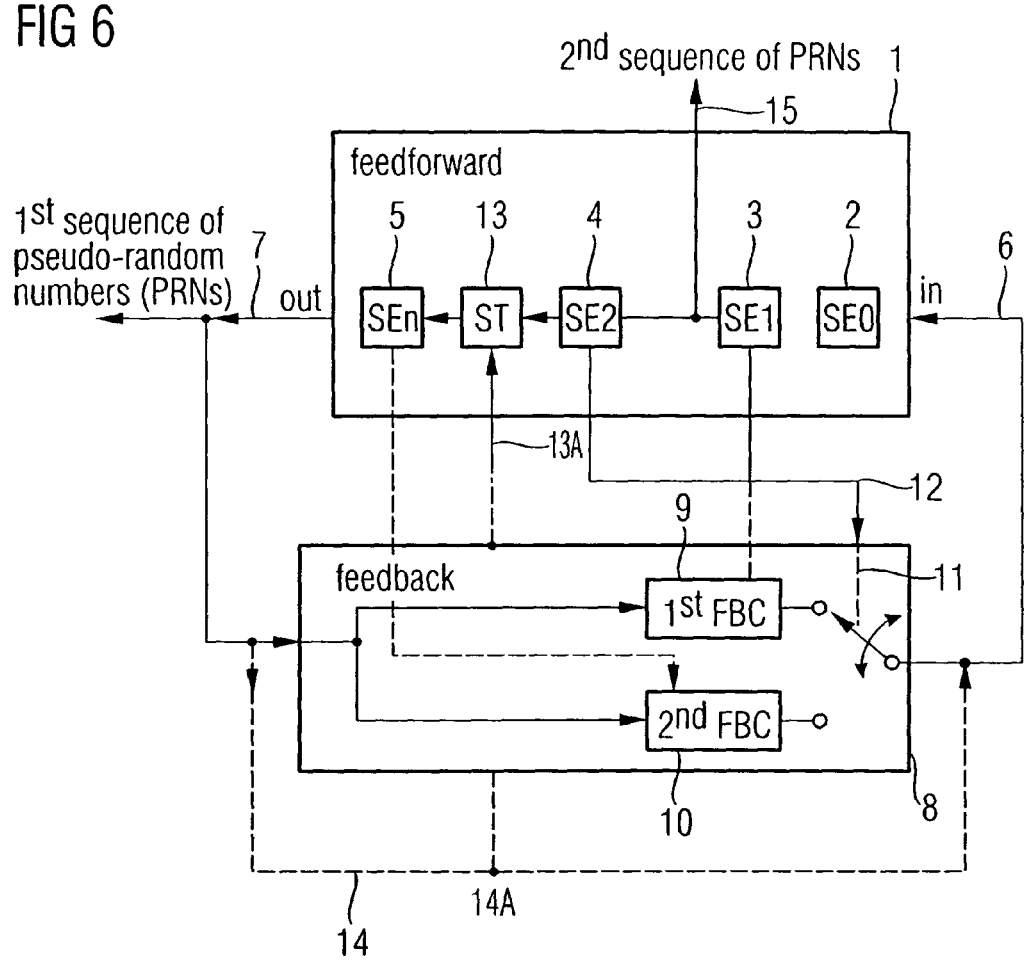

- if contents of memory element 4 = 0,
  then feedback polynomial $X^8 + X^7 + 1$

- if contents of memory element 4 = 1,
  then feedback polynomial $X^8 + X^6 + 1$

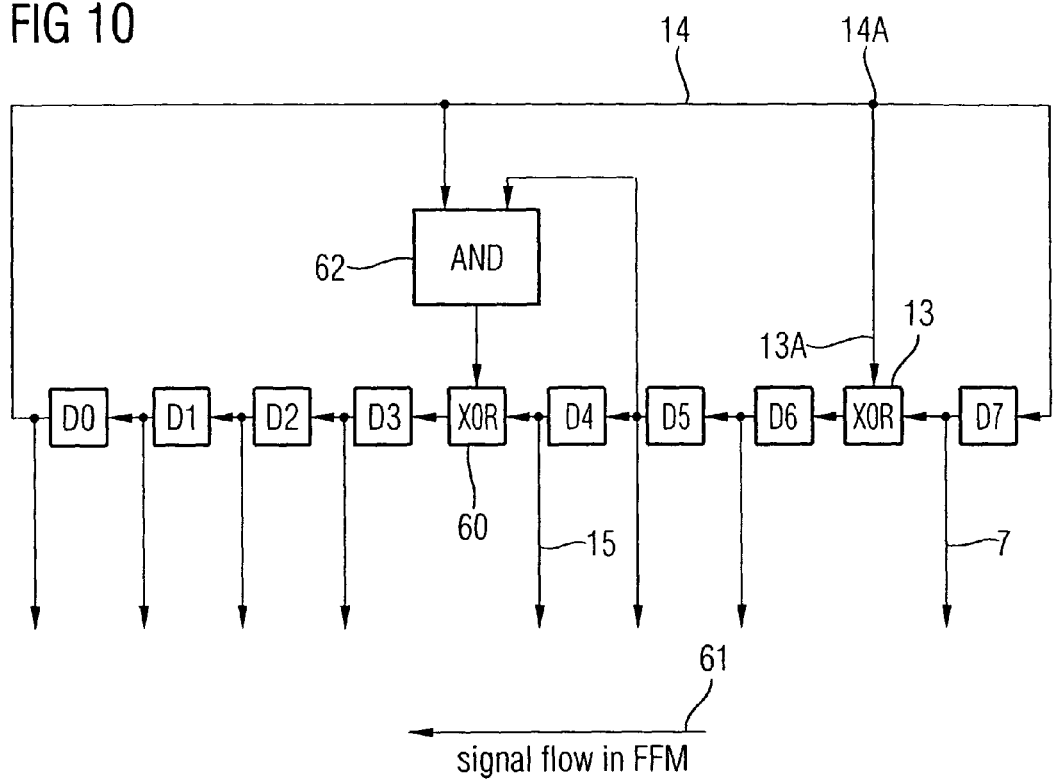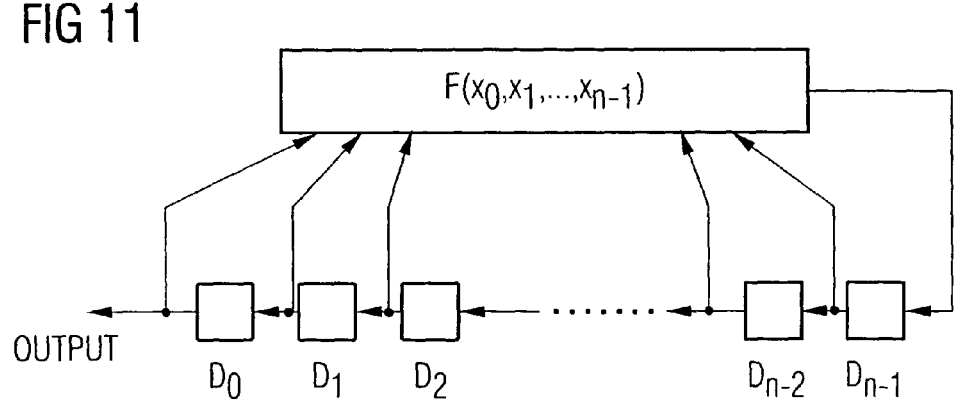

RANDOM NUMBER GENERATOR CONFIGURED TO COMBINE STATES OF MEMORY CELLS

CROSS-REFERENCE TO RELATED APPLICATION

This application claims priority from German Patent Application No. 10 2004 013 480.4, which was filed on Mar. 18, 2004, and is incorporated herein by reference in its entirety.

BACKGROUND OF THE INVENTION

1. Field of the Invention

The present invention relates to pseudo-random number generators and, in particular to pseudo-random number generators suitable for key generators in bus encryption.

2. Description of Related Art

A well-known random number generator is illustrated in FIG. 12. The pseudo-random number generator of FIG. 12, which is also referred to as a linear feedback shift register, includes a plurality of memory elements 51, 52, 53, 54 which, in FIG. 12, are numbered from 0 to n. The memory cells can be initialized to a starting value via initializing means 55. The memory cells 51-54, taken together, form feed forward means, whereas the linear shift register formed by the memory cells 51-54 is fed back via feedback means coupled between an output 56 of the circuit and the memory cell n. The feedback means in particular includes one or several combining means 57, 58 fed by respective feedback branches 59a, 59b, 59c, as is exemplarily illustrated in FIG. 12. The output value of the last combining means 58 is fed to the memory cell n which, in FIG. 12, is referred to by 54.

The linear feedback shift register illustrated in FIG. 12 is operated by a clock such that in each clock cycle the occupancy of the memory cells is shifted by one step, referring to FIG. 12, to the left so that in each clock cycle the state stored in the memory means 51 can be output as a number, wherein at the same time the value at the output of the last combining means 58 is fed into the first memory unit n of the sequence of memory units. The linear feedback shift register illustrated in FIG. 12 thus provides a sequence of numbers responsive to a sequence of clock cycles. The sequence of number obtained at the output 56 depends on the starting state produced by the initializing means 55 before taking the shift register into operation. The starting value input by the initializing means 55 is also referred to as a seed, which is why such arrangements as illustrated in FIG. 12 are also referred to as seed generators.

The sequence of numbers obtained at the output 56 is called a pseudo-random sequence of numbers since the numbers apparently follow one another in a random manner, but, altogether, are periodical even if the period duration is great. Additionally, the sequence of numbers can be repeated uniquely and thus has a pseudo-random nature when the initializing value fed to the memory elements by the initializing means 55 is known. Such shift registers are, for example, employed as key stream generators to provide a stream of encryption/decryption keys depending on a special initializing value (seed).

Such shift registers illustrated in FIG. 12 have the disadvantage of a low linear complexity. With an n-bit LFSR (LFSR=linear feedback shift register), for example, 2 n bits of the output sequence are sufficient to calculate the entire sequence. The advantage of such LFSRs illustrated in FIG. 12, however, is that the hardware complexity is very low.

Additionally, there are irregularly clocked LFSRs. They are of a somewhat increased hardware complexity with a mostly smaller period. The linear complexity, however, may be increased considerably. A disadvantage of such irregularly clocked devices, however, is the fact that, due to the irregular clocking, the output sequence may be derived in principle by measuring the current using an SPA (SPA=simple power analysis). By using the shift register devices as parts of key generators which produce data to be kept secret inherently, i.e. key data, it is of particular importance for them to be safe from any kinds of cryptographic attacks.

On the other hand, there is, however, the requirement in such devices, in particular when they are accommodated on chip cards, that the hardware complexity be small. Put differently, the chip area that devices of this kind occupy must be as small as possible. This is due to the fact that, in semiconductor manufacturing, the chip area of an entire device in the end determines the price and thus the profit margin of the chip producer. In addition, a specification, in particular in chip cards, for example, is for a customer to determine a maximum area in square millimeters a processor chip may comprise, on which functionalities of the most different kinds must be accommodated. Thus, it is the task of the circuit producer to distribute this precious area to the individual components. With regard to cryptographic algorithms, which are getting increasingly complex, chip manufacturers make efforts for the chip to have as much storage capacity as possible to be able to calculate algorithms requiring lots of working memory within a reasonable time. The chip area for key generators and other components of this kind thus has to be kept as small as possible in order to be able to accommodate a greater storage capacity on the chip area given.

The general requirement for key generators or devices for generating a pseudo-random sequence of numbers thus is to be safe on the one hand and, on the other hand, to require the smallest amount of space possible, i.e. to entail the smallest hardware complexity possible.

Random number generators can, for example, be employed for bus encryption. Here, reference is made to FIG. 13 showing a conventional bus encryption concept. At the beginning of a bus, a bit $m_i$ to be transferred via the bus must be encrypted for protection while being transmitted on the bus line. At the end of the bus, the encrypted bit must be converted again to the unencrypted bit in order for the bit $m_i$ to be processed further. The beginning of the bus can, for example, be the output of a processor, whereas the end of the bus may be the input into a memory in which the bit is typically re-encrypted to a "harder" type of encryption to be finally stored in the memory. Alternatively, the beginning of the bus may also be a memory output interface and the end of the bus may be an input of a processor.

In general, it is assumed that bits transmitted on bus lines are in particular danger there so that bus encryption is employed here. An XOR gate including a message bit $m_i$ to be encrypted at its first input and including a key bit $k_i$ at its second input, which is typically generated by a random number generator, is used as typical encryption means. Typically, the temporal sequence of key bits $k_i$, $i$ being the time index, is a pseudo-random number sequence, i.e. a sequence of numbers looking like a random number sequence which, however, is deterministic in that it can be reproduced. Typical random number generators are, as will be explained later, feedback shift registers producing, departing from a defined starting state (seed), a defined output sequence having a certain period duration.

In bus encryption, as is shown in FIG. 13, the same key sequence generator, having an identical setup, is used at the beginning and the end of the bus, wherein the key sequence generators—except for a delay, which can often be neglected, which the encrypted bit $c_i$ "suffers" due to the transfer via a bus of a certain length—operate synchronously.

Up to now, a key sequence generator has been used as the shift register. Since a bus is made up of several bus lines, such as, for example, of 32 bus lines, each bus line is to be provided with a key sequence. This problem can be solved by providing a memory cell in a feedback shift register for each bus line and feeding the state of each memory cell—over the time considered—to the encryption input of bus encryption means/bus decryption means. This means that, for example, the state of the seventh memory cell, over time, serves as the key sequence for encrypting the eighth bus line, that, for example, the state of the sixth memory cell, over time, serves as the key sequence for encrypting the seventh bus line, etc.

Every cell of the shift register will thus be output, wherein this output sequence will then be used for encrypting a corresponding bus line.

This, however, means that the same key sequence is basically always used for encrypting all the bus lines, since the individual key sequences are only shifted versions of one and the same shift register sequence.

From the point of view of safety, this is, of course, of disadvantage in that the attacker, once he has established a key sequence, will automatically obtain all the other key sequences with which the other bus lines are encrypted with this single key sequence by temporal shifting.

Another disadvantage is that shift registers comprising at least as many cells are required as there are bus lines to be supplied. Consequently, a shift register having at least 32 shift register cells is required for a 32-bit wide bus.

In summary, the concept described is of disadvantage in that the safety of the encryption is critical because all the bus lines are encrypted by the same sequence—only temporally shifted—and in that additionally there is an efficiency problem with regard to the chip area consumption, since at least as many memory cells are required as there are bus lines.

In particular with regard to the chip area consumption, it is to be mentioned that this is a considerable cost factor for products offered in large numbers.

Apart from the cost factor, there are further restrictive requirements to the chip area consumption, in particular for chip card applications, since the size of a chip is predetermined by the user, i.e. the chip card manufacturer. Typically, the chip card manufacturer has the possibility to divide the chip area available according to his demands for logic elements, memory elements, etc. Due to high computing performance, the highest possible portion is thus required for working memory and computing power so that area savings with every single element, such as, for example, a shift register pseudo-random number generator, are of great importance to meet the overall chip area criteria.

SUMMARY OF THE INVENTION

It is an object of the present invention to provide a safe and efficient concept for generating random numbers.

In accordance with a first aspect, the present invention provides a random number generator having: a plurality of memory cells arranged in a series; feedback means for generating a feedback signal and for feeding the feedback signal into one of the memory cells; and random number output means formed to combine states of a group of at least two memory cells to obtain an output sequence.

In accordance with a second aspect, the present invention provides a bus encryption device having: a bus having a number N of parallel bus lines; for each bus line, encrypting or decrypting means for encrypting or decrypting a signal on the bus line using a key for the bus line; and a random number generator having a plurality of memory cells arranged in a series, feedback means for generating a feedback signal and for feeding the feedback signal into one of the memory cells, and random number output means, the random number out means being formed to generate an output sequence for each bus line by combining states of a group of memory cells and to feed it to means for decrypting or encrypting for the bus line, the random number output means being formed such that a group of memory cells differing from a group of memory cells provided for another bus line is provided for each bus line.

In accordance with a third aspect, the present invention provides a method for generating random numbers with a random number generator having a plurality of memory cells arranged in a series and feedback means for generating a feedback signal and for feeding the feedback signal into one of the memory cells, having the step of: combining states of a group of at least two memory cells to obtain an output sequence.

In accordance with a fourth aspect, the present invention provides a computer program having a program code for performing the above mentioned method when the computer program runs on a computer.

BRIEF DESCRIPTION OF THE DRAWINGS

Preferred embodiments of the present invention will be detailed subsequently referring to the appended drawings, in which:

FIG. 1 shows a block circuit diagram of an inventive random number generator;

FIG. 2a shows a block circuit diagram of a component of the random number output means according to a preferred embodiment of the present invention;

FIG. 3 shows a block circuit diagram of a preferred embodiment for a random number generator having a switchable non-linear feedback function;

FIG. 6 shows a preferred setup of an elementary shift register having non-linear feedback;

FIG. 10 shows an exemplary setup for an elementary shift register having non-linear feedback;

FIG. 11 is a general representation of an elementary shift register having memory cells in feed forward means and a feedback function F;

DESCRIPTION OF PREFERRED EMBODIMENTS

Figure 2B:
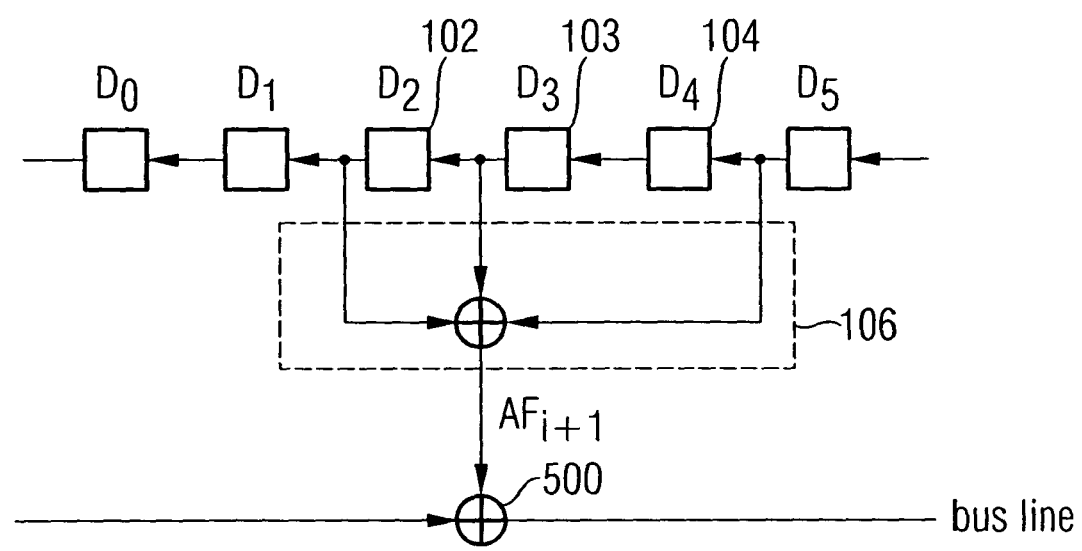
FIG. 2b shows a generalized block circuit diagram of an alternative random number output means according to a preferred embodiment of the present invention.

The present invention is based on the finding that the memory cell output sequences must not be used for bus encryption in a form "as they are" but that output sequences of a group of at least two memory cells have to be combined so that an output sequence is formed of a sequence of at least two (time-shifted) output sequences of the two memory cells.

Additionally, if another output sequence is generated by combining two different memory cells or by another combination of the same memory cells, the two output sequences obtained will not only be two sequences time shifted with regard to each other but otherwise identical, but also be pseudo-random bit sequences differing significantly from each other. If an attacker in this case finds out a key sequence for a bus line, he will by no means be able to decrypt all the other bus lines because he does not know from which original memory cell states the sequence has been generated and which combining means has been used. An attacker can thus no longer derive other deciphered sequences from a deciphered sequence by a simple time-shift, as is the case in the prior art, but will have to find out which memory cells have been combined and how they have been combined.

Because there are many combination possibilities for a system of logic gates, this "tracing back" for decrypting a second output sequence is arbitrarily complicated, due to a first output sequence decrypted somehow.

Additionally, the inventive concept is significantly more efficient since the number of memory cells need not equal the number of bus lines but since the number of memory cells may be smaller than the number of bus lines. Thus, a bus of, for example, eight bus lines of a shift register can easily be supplied by only five memory cells. This, compared to the prior art where eight memory cells were required for eight bus lines, means that three memory cells are saved, wherein additionally the eight output sequences generated differ from one another significantly and are not, as was the case in the prior art, time-shifted versions of the same shift register sequence.

According to the invention, output sequences of the cells of the preferably non-linear maximally periodical shift register are not directly used for bus encryption, but a few of these output sequences are added to one another (term by term, modulo 2) and the sum sequences formed in this way are then used for bus encryption. It is to be pointed out that the sum sequences, under absolutely controllable conditions, for example when the number of shift register cells is a prime number, have a maximum period, a maximum linear complexity, a balanced zero-1 relation and an increased polynomial complexity.

Additionally, it is now possible to supply, for example, a 32-bit wide bus by, for example, one shift register only having 11 cells, in a way that each of the 32 bus lines receives its own encryption sequence and that no two encryption sequences are shifted versions of each other.

Hardware can be saved here because in typical bus systems this random number generator will not only be present at a single position but, for example, ten times or even more frequently at different positions in an identical form in a processor bus system.

Before preferred embodiments of the present invention will be explained in greater detail referring to FIGS. 1 to 4, the concept known with regard to safety problems and with regard to efficiency problems will be illustrated again referring to FIGS. 5a and 5b. FIG. 5a shows a sequence of memory cells $D_0, D_1, D_2, \ldots, D_5$ and bus encryption means 500 which, in this embodiment, is formed as an XOR gate. It is insignificant here whether the input bit on the line to the left of the XOR gate 500 is an encrypted or an unencrypted bit. If it is an unencrypted bit, the gate 500 will be an encryption unit. If the bit, however, is an encrypted bit, the gate 500 will be a decryption means to which the state of the memory cell $D_3$—considered over time—is fed at the key input 502 to obtain the key sequence 502 to have the bit in an encrypted or decrypted form, as is desired, at the output of means 500.

Figure 5A:
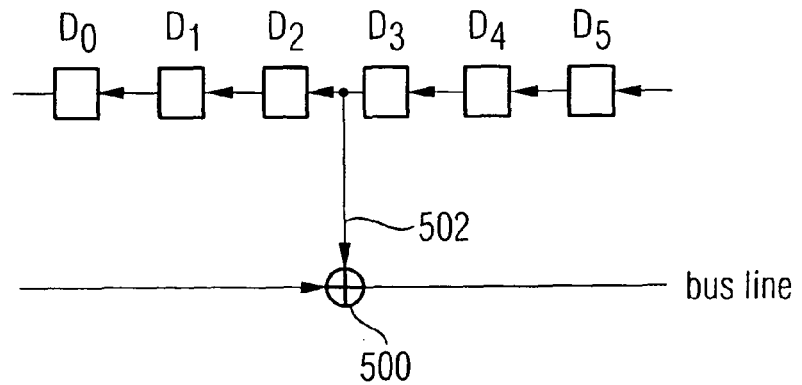
FIG. 5a is a principle illustration of a well-known bus encryption with the example of a single bus line.
Figure 5B:
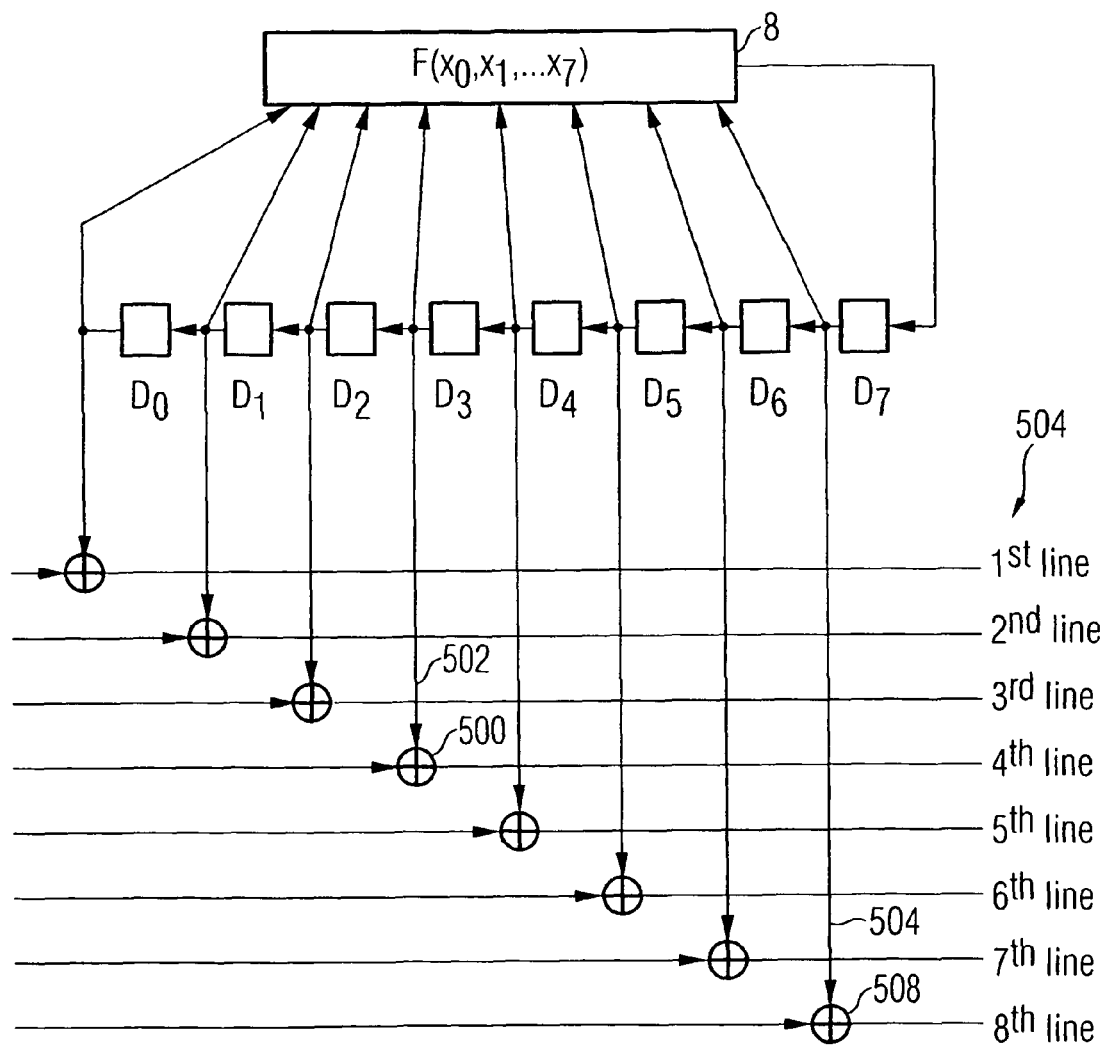
FIG. 5b is a principle illustration of a well-know bus encryption with the example of several bus lines.

If different bus lines are required, such as, for example, eight bus lines 504, the concept shown in FIG. 5b may be used where many bus lines are provided for the one encryption unit, such as, for example, the encryption unit 508 for the eighth bus line, wherein every encryption unit 500, 508 includes its own encryption lines 502, 504.

The shift register shown in FIG. 5b includes eight shift register cells and a feedback unit 8 typically including a linear feedback polynomial.

If the shift register shown in FIG. 5b thus generates the sequence $\sigma_0 = k_0, k_1, k_2, k_3, \ldots$ at the output of the memory cell $D_0$, the memory cell $d_1$ downstream of the memory cell $D_0$ will generate a time-shifted shift register sequence of $k_{-1}, k_0, k_1, k_2$.

The output sequence of the memory cell $d_1$ thus is a version, shifted by one bit, of the output sequence of the memory cell $D_0$ so that the individual key sequences can be derived from one another easily for encrypting the individual bus lines.

In order to avoid these disadvantages the concept shown in FIG. 1 is used according to the invention. FIG. 1 shows a random number generator comprising a plurality of memory cells 100, 101, 102, 103, 104 arranged in a series, wherein the direction of processing is as is shown in FIG. 1 by the arrows. Thus, the memory cell 103 is downstream of the memory cell 104 but upstream of the memory cell 102.

Additionally, feedback means 105 is provided, the feedback means serving to generate a feedback signal generated and output and fed to the memory cell 104 on the right hand side of the feedback means 105. The inventive random number generator concept is characterized by a random number output means 106 formed to combine states of a group of at least two memory cells to obtain one or several output sequences $AF_0, AF_1, AF_2, \ldots$.

An exemplary version of the random number output means 106 is, for example, shown in FIG. 2a. The output sequences resulting from the temporally successive states of the memory cells $D_4$ and $D_3$ are combined by an XOR gate to generate the output sequence $Af_i$ fed to bus encryption unit 500 to encrypt a plain text bit to the left of the encryption unit 500 to be able to transmit it to the bus lines. If, however, the bit to be processed in an encrypted bit, the means 500 will be decryption means and the key sequence $Af_i$ serves to decrypt a bit having been encrypted by an identical sequence Afi arranged and generated someplace else on the chip.

FIG. 2b shows an alternative embodiment of the random number output means 106, wherein the group of memory cells, the states of which are combined, no longer includes the memory cells $D_4$ and $D_3$ but, in contrast to FIG. 2a, now includes the memory cells $D_2, D_3$ and $D_5$. Again, the combining means in the random number output means is formed as an XOR gate which now, in contrast to FIG. 2a, has three inputs.

It is to be mentioned that any combinations, which need not be XOR gates but can also include all the other logic gates, such as, for example, AND gates, NAND gates, OR gates, NOR gates, XNOR gates, etc., can be used as combining means, as long as the output sequences of at least two memory cells are combined somehow to generate a combined output sequence.

Additionally, it is preferred with regard to high safety for the inventive random number generator to provide several output sequences which differ from one another and thus are not derived by a temporal shift from one and the same shift register sequence. This is obtained by combining, as is shown in FIGS. 2a and 2b, different groups of memory cells with regard to their output sequences. Different output sequences can also be achieved by a different combination. A second output sequence $Af_i$ could, for example, together with the circuit shown in FIG. 2a, be used to generate an output sequence $Af_{i+1}$ where the state sequences of the memory cells $D_4$ and $D_3$ are not combined by an XOR operation but by, for example, an AND operation. XNOR, etc. could, of course, be used instead of XOR.

Preferably, the output means 106, as is illustrated in FIG. 1, is formed to generate all the output sequences $AF_0, \ldots, AF_k$ such that all the sequences differ from one another in that either the group of memory cells from which the output sequence is formed by combination is different for every output sequence and/or that the combining rule with which state sequences of a group of memory cells are combined is different for different output sequences.

Additionally, the inventive concept is of advantage in that the number of output sequences $AF_k$ can, as is also shown in FIG. 1, be considerably greater than the number of memory cells, which was not the case in the comparative concept shown in FIG. 5b.

The disadvantage of using basically the same sequence for encrypting the individual bus lines is avoided according to the invention, as will be explained subsequently.

A feedback shift register having N cells $D_0, D_1, \ldots, D_{n-1}$ will be considered. Additionally, $\sigma_0$ be the output sequence of the cell $D_0$ in the very front. $\sigma_1$ be the output sequence of the second cell $D_1, \ldots$, and $\sigma_{N-1}$ be the output sequence of the last cell $D_{N-1}$.

It is additionally preferred for the basic shift register to be non-linear, i.e. to have non-linear feedback means, and for it to be able to generate a maximally periodic sequence, wherein the period equals $2^{N-1}$. In this case, all the sequences $\sigma_0, \sigma_1, \ldots, \sigma_{N-1}$ will have the maximum period length $2^{N-1}$, wherein it can be shown that the sequences all have the same linear complexity. The linear complexity may have the value $2^{N-2}$, but will always be at least $2^{N-1}$.

It is to be noted that the sequences $\sigma_1, \ldots, \sigma_{N-1}$ are only shifted versions of the sequence $\sigma_0$.

Truly different sequences can be obtained when the individual sequences $(\sigma_0, \sigma_1, \ldots, \sigma_{N-1}$ are, for example, added, such as, for example, $\sigma_0+\sigma_1$ or $\sigma_2+\sigma_5+\sigma_7$, etc.

An embodiment of the addition is the term-by-term addition modulo 2. This has the following meaning:
$\sigma_1$=0011010 . . . and $\sigma_6$=1011100 . . . , resulting for the addition modulo 2 of $\sigma_1$ and $\sigma_6$=100110 . . . .

In order to render the output sequences, in the case of an addition modulo 2, strongly different from one another, it is preferred for the basic shift register to have non-linear feedback. Here, the addition will provide completely new sequences. Thus, it is preferred for the bus encryption to be based on non-linear shift registers.

It will be explained subsequently why sequences generated by additions have favorable characteristics. It is assumed that $\sigma_0, \sigma_1, \ldots, \sigma_{N-1}$ are output sequence of a non-linear shift register which can generate sequences of a maximum period, i.e. of the period $2^{N-1}$. The sequences $\sigma_0, \sigma_1, \ldots, \sigma_{N-1}$ each have the period of $2^{N-1}$. It is assumed that L be the linear complexity of $\sigma_0$, so that L will also be the linear complexity of $\sigma_1, \sigma_2, \ldots, \sigma_{N-1}$. If N is a prime number, i.e. if the number of cells of the basic shift register is a prime number, the following will apply:

Every sequence $\tau$ resulting from an addition of sequences of $\{\sigma_0, \sigma_1, \ldots \sigma_{N-1}\}$ will always have a period length $2^{N-1}$ and a linear complexity L.

Additionally, nearly the same number of zeros and ones will exist within a full period of $\tau$. More precisely, there are $2^{N-1}-1$ zeros and $2^{N-1}$ ones.

The follow applies for the example of N=7:
$(\sigma_0, \sigma_1, \ldots \sigma_6$ have a period of $2^7-1=127$ and a linear complexity L=126. The sequence $\tau=\sigma_2+\sigma3$ will then have a period of 127 and a linear complexity of 126. In a full period of $\tau$, there are thus 63 zeros and 64 ones.

The inventive concept, i.e. the idea of not feeding the output sequences of the individual shift register cells directly to the individual bus lines but to combine them before with one another, for example by an addition modulo 2, has an important consequence. It is then possible to supply all the bus lines with different encryption sequences, wherein the different encryption sequences can be derived from a shift register having fewer memory cells than there are bus lines. A 32-bit wide bus of a chip is, for example, supplied by a shift register containing only 11 memory cells.

This idea will be illustrated subsequently referring to FIG. 4. The shift register shown in FIG. 4 has five cells and supplies eight bus lines with different key sequences. Every bus line has its own encryption or decryption means 500, an output sequence $AF_1$ to $AF_8$ being applied to the key input of each encryption or decryption means. As can be seen from FIG. 4, the group of memory cells including the memory cells $D_0$ and $D_1$ is used for generating the output sequences $AF_1$. Additionally, the group of memory cells including the memory cells $D_0+D_1+D_2$ is used for generating the output sequence $AF_2$. The group of memory cells including the memory cells $D_0$ and $D_2$ is used for generating the output sequence $AF_3$.

The group of memory cells for the output sequence $AF_4$ is the group including the memory cells $D_0$, $D_1$ and $D_3$.

In analogy, the output sequence $AF_5$ is generated by combining the memory cells of the group provided for the fifth bus line, including the memory cells $D_0$ and $D_3$.

Similarly, the output sequence $AF_6$ is generated from the memory cells forming a group as $D_0$, $D_1$ and $D_4$.

In analogy, the output sequence $AF_7$ for the bus encryption of the seventh bus line is generated by the group of memory cells including $D_0$ and $D_4$.

Finally, the output sequence $AF_8$ is generated from the combination of the states of the groups of memory cells including the memory cells $D_0$, $D_2$ and $D_4$.

Figure 4:
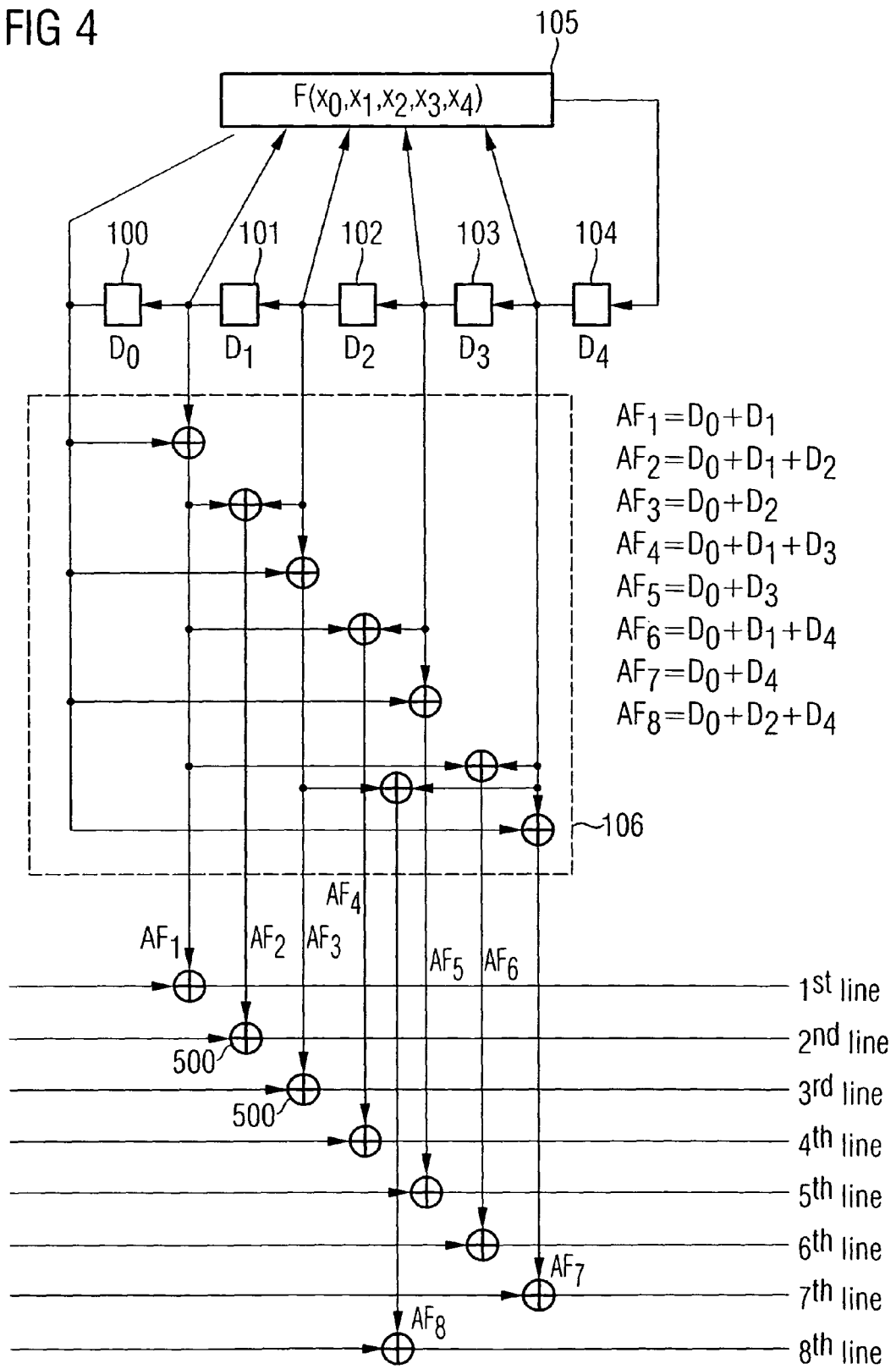
FIG. 4 shows a random number generator according to an embodiment of the present invention in the context of bus encryption.

Further output sequences could be generated in FIG. 4, such as, for example, the output sequence where all the memory cells $D_0$, $D_1$, $D_2$, $D_3$ and $D_4$ are used for the group of memory cells.

Furthermore, all the groups of memory cells each including four memory cells are not used in the embodiment shown in FIG. 4. Thus, it can be seen that considerably more than eight output sequences may be generated from the five memory cells $D_0$ to $D_4$, each sequence differing from another sequence when the feedback means 105 includes a non-linear feedback characteristic, as will be explained later.

Apart from the memory cells $x_0, \ldots, x_{10}$, FIG. 3 includes a first AND gate 212, a second AND gate 213, a first. XOR gate 214, a second XOR gate 218 and an inverter 216 to implement the two alternative functions F(x) and G(x), as are illustrated in FIG. 3, depending on the position of the switch 203. The result of the switch 203 is, so to speak, "coupled into" the feedback by another XOR gate 221. The switch has the control input 204 to which the control signal z is applied. The control input 204 is connected to an external random number generator 210 or an external control in the external random number generator (RNG) for providing the control signal z.

Subsequently, a number of different embodiments for forming the individual elementary shift registers 101-111 of FIGS. 6 to 9 will be explained subsequently referring to FIGS. 6 to 10. It is to be pointed out that not all the shift registers, such as, for example, the shift registers 101-111 in FIG. 5, need have the same setup but that they may have different setups as long as at least one, and preferably all, of the shift registers have a non-linear feedback characteristic.

FIG. 6 shows an elementary shift register having non-linear feedback for generating a pseudo-random sequence of numbers, having feed forward means 1 comprising a sequence of memory units 2 to 5 and further including an input 6 and an output 7 corresponding to the output of the device for outputting the sequence of pseudo-random numbers. It is to be mentioned that the sequence of pseudo-random numbers may be supplemented by other means not shown in FIG. 6 to buffer, to combine in a different manner, etc. sequences of random numbers.

The device shown in FIG. 6 also includes feedback means 8 comprising a variable feedback characteristic and connected between the input 6 and the output 7 of the feed forward means 1. The variable feedback characteristic of the feedback means 8 is illustrated in FIG. 6 in that the feedback means 8 can take a first feedback characteristic 9 or a second feedback characteristic 10, wherein switching means 11, for example, can switch between the first feedback characteristic 9 and the second feedback characteristic 10. The control signal for the switching means 11 is, only exemplarily, provided by the fourth memory means SE2, as is symbolically illustrated by a signal path 12. The first feedback characteristic 9 and the second feedback characteristic 10 differ in an embodiment shown in FIG. 6 in that the state of the memory means 1 (No. 3) enters the feedback in the case of the first feedback characteristic, whereas the state of the memory means 5 (SEn) contributes to the feedback in the case of the second feedback characteristic.

Alternatively or additionally, the feedback means 8 may be formed such that a different combination rule is employed in the feedback characteristic combining the value at the output 7 of the feed forward means and an internal state of the feed forward means, depending on the feedback characteristic selected. Thus an AND combination could, for example, be employed in the first feedback characteristic for combining the value at the output 7 and the value of the register cell 3, whereas the second feedback characteristic differs from the first feedback characteristic in that an OR combination and not an AND combination is employed for combining the two values mentioned. It is obvious to those skilled in the art that different kinds of different combination rules may be used here.

Additionally, values of the memory means SE1 or SEn need not be fed directly to combining means in the feedback means, but these values may, for example, be inverted, combined with one another or processed in any manner, such as, for example, non-linearly, before the processed values are fed to combining means.

Furthermore, it is not essential for the switching means 11 to be controlled directly by the state of the memory unit SE 2. Instead, the state of the memory means SE2 could be inverted, processed logically or arithmetically in any manner or even combined with the state of one or several more memory means, as long as the result is a device for generating a pseudo-random sequence of numbers having feedback means, the feedback characteristic of which is not static but can be varied dynamically depending on the feed forward means and, in particular, on one or several states in memory units of the feed forward means.

Additionally, control means 13 arranged between two memory elements, i.e. in the example shown in FIG. 6, between memory elements 4 and 5, is introduced into the feed forward means 1 of FIG. 6. Because a signal flow is from the memory element 0 to the memory element n in FIG. 6, the memory element 4 is the memory element arranged upstream of control means in a signal flow direction, whereas the memory element 5 is the element arranged downstream of the control means in a signal flow direction. The control means 13 has a control input 13a which can be provided with a control signal which, in principle, can be any control signal.

The control signal can, for example, be a true random number sequence so that the output sequence of the shift register assembly is a random number sequence. The control signal may also be a deterministic control signal so that a pseudo-random number sequence will be obtained at the output side.

Preferably, the control input 13a is, as is illustrated by the corresponding broken line shown in FIG. 6, connected to the feedback means 8 such that a signal in the feedback means provides the control signal for the control means 13, i.e. the control signal is a deterministic signal.

Even though in the embodiment shown in FIG. 6 the feedback means 8 is referred to as variable feedback means, the feedback means may also be feedback means having a constant feedback characteristic, as is indicated by a broken line 14. In this case, the control signal for the control input 13a would be derived from a branching point 14a, as is schematically illustrated in FIG. 6 by the broken line from point 14a to the control input 13a of the control means 13.

Additionally, the elementary number sequence generator shown in FIG. 6 is used, to increase efficiency, to generate, for example, not only one sequence at the output 7 but also a second sequence of preferably pseudo-random numbers at another output 15, wherein both sequences or only one sequence of the two sequences may be fed to the combining means. Introducing the control means 13 has the effect that the sequence output at the output 7 really differs from the sequence output at the output 15, wherein the two sequences are not only shifted with regard to each other but are really, as has been explained, different since they are "tapped" upstream and downstream of the control means 13, respectively, in a signal flow direction.

Figure 7:
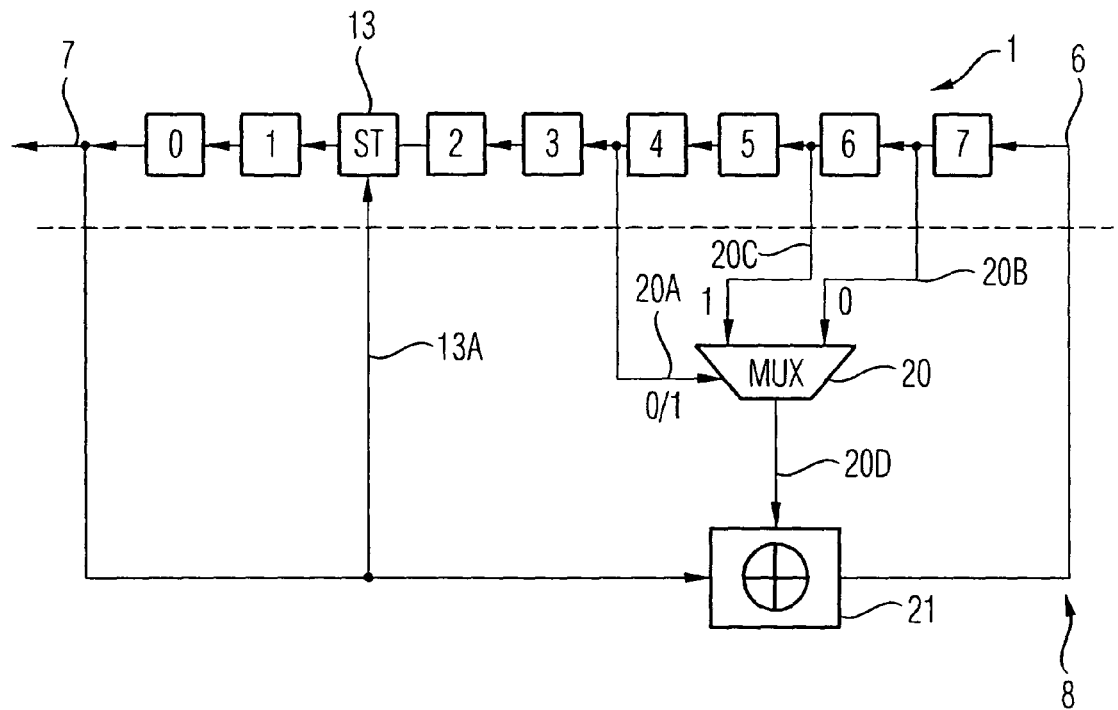
FIG. 7 shows an alternative setup for an elementary shift register having non-linear feedback.

FIG. 7 shows an 8-bit shift register where a multiplexer 20 is controlled via a control input 20a depending on the state of the memory means no. 4. If the control input 20a is in a zero state, i.e. if there is a zero state in the memory cell no. 4, the multiplexer will be controlled such that it connects the state of the memory means no. 7 at a first input line 20b thereof to an output lines 20d. This would have the effect of a linear shift register having the following feedback polynomial:

$$x^8+x^7+1$$

If the control input 20a, however, is in a one state, the state of the memory means no. 6 at a second input 20c will be connected to the output line 20d of the multiplexer 20. The output line 20d is connected to combining means 21 to which is also fed, in the embodiment shown in FIG. 7, the value at the output 7 of the feed forward means which at the same time forms the output of the device for generating a pseudo-random sequence of numbers. The result calculated by the combining means 21 in turn is fed to the first memory means no. 7 in FIG. 7.

If the contents of the memory cell no. 4 equals 1, the following feedback polynomial will apply:

$$x^8+x^6+1$$

It becomes obvious from the above that switching takes place between the two mentioned feedback polynomials, depending on the contents of the memory cell no. 4 of the feed forward means 1.

It has been found out that the linear complexities of sequences obtained inventively are high, i.e. between 234 and 254, when the shift register comprises 8 flip-flops. It is also to be mentioned that the period length of a sequence generated by any eight-stage shift register, can maximally be 255. The maximum value for the linear complexity of such a sequence is 254.

The easiest of all eight-stage elementary shift registers which can generated a sequence is the shift register illustrated in FIG. 7 having the two feedback polynomials illustrated in FIG. 7. As regards the theory of linear shift registers as a comparative example, it is to be noted that there are 16 primitive $8^{th}$ degree polynomials. Each polynomial of this kind describes a linear shift register which can generate a sequence of the period length 255 and the linear complexity 8. In contrast, according to the present invention, there are many more shift registers—namely 2020—which can generate the sequences of the period length 255 according to the present invention.

Additionally, the sequences generated by the inventive shift registers comprise much greater linear complexities than the analog forms thereof according to the prior art. As has already been explained, the embodiment shown in FIG. 7 is preferred among all the possibilities examined for an 8-bit shift register having feedback means because it entails the easiest hardware complexity, at the same time has a maximum period duration and also comprises a maximum linear complexity.

In FIG. 7, control means 13 is again arranged between two memory elements, these elements being memory elements 1 and 2. The control means 13 is supplied with a control signal tapped from the feedback means 8 having a variable feedback characteristic. The signal for the control means could, of course, also be "tapped" downstream of the XOR gate 21 in a signal flow direction. Additionally, the control means 13 may, of course, also be formed between any two other memory cells, such as, for example, between the memory cells 5 and 6 or between the memory cells 0 and 7, i.e. either downstream of the memory cell 0 in the signal flow direction so that the signal at the output of the memory means will be output directly at the output 7, or directly upstream of the memory cell 7.

For reasons of signal processing, it is, however, preferred for all the signals, such as, for example, output sequences, control signals and data signals for the multiplexer, etc., to be tapped at the output of shift registers so that the shift register, apart from its functionality for generating the number sequence also serves to provide stable signals for logic gates. Thus, there is no need to produce corresponding output stages for logic gates when control signals or output signals are tapped from the outputs of the logic gates themselves.

Figure 8:
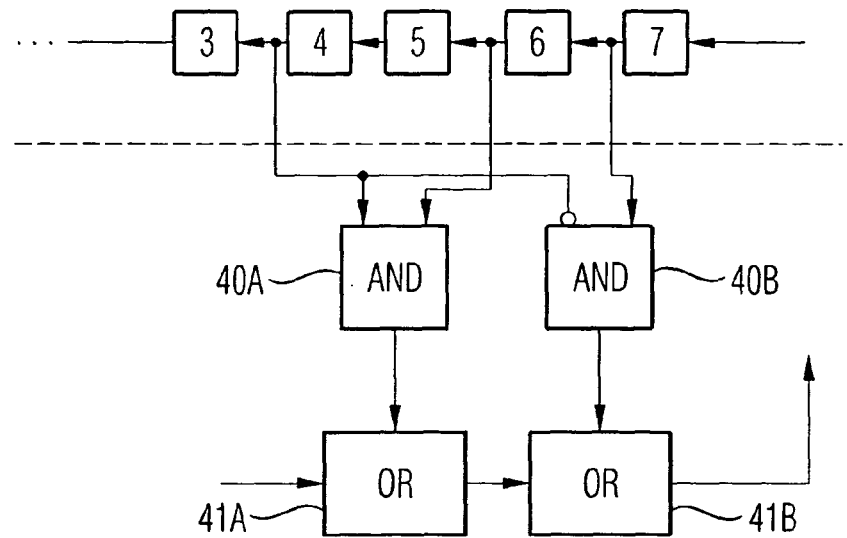
FIG. 8 shows an alternative setup for an elementary shift register having non-linear feedback.

Subsequently, reference will be made to FIG. 8 to illustrate a special implementation of the multiplexer means 20 of FIG. 7. The multiplexer 20 may easily be implemented by two AND gates 40a, 40b both connected to OR gates (or XOR gates) 41a, 41b connected in series in the way shown in FIG. 8. In particular, the state of the memory cell 4 is fed to the first AND gate 40a, whereas the inverted state of the memory cell 4 is fed to the second AND gate 40b. In order to determine the corresponding feedback polynomial, the contents of the memory cell 6 is fed to the first AND gate 40a as a second input, whereas the contents of the memory cell 7 is fed to the second AND gate 40b as a second input. It is also to be pointed out that the two OR gates 41a, 41b connected in a series can be implemented alternatively. If, however, implementations where each logic gate has two inputs and an output are required, the illustration exemplarily shown in FIG. 8 will be of advantage.

In a method for generating a pseudo-random sequence of numbers from an elementary shift register using feedback means 1 having a plurality of memory means, comprising an input and an output for outputting the sequence of numbers, and feedback means comprising a variable feedback characteristic and connected between the input and the output, a step of initializing the memory means in the feed forward means to a predetermined starting value will be performed at first.

Responsive to a state of a memory means of the plurality of memory means of the feed forward means, the control means will then be controlled in another step depending on the feedback signal. Subsequently, a state of memory means connected to the output of the feed forward means 1 will be output to obtain a number of the sequence of random numbers. After that, it is examined in a decision block whether further random numbers are required. If this question is answered by a no, the method will end here. If, however, it is determined that further numbers are required, the decision block will be answered by a "yes", whereupon another step is performed where the plurality of memory means are re-occupied based on a previous state of the memory means and on an output of the feedback means. The steps of controlling the control means, outputting and re-occupying are repeated in a loop as often as is desired to finally obtain the pseudo-random sequence of numbers.

It is to be pointed out that this method can be performed using a regular clock or using an irregular clock, even though the variation including the regular clock is preferred with regard to an increased safety against power or time attacks.

In the case of the linear shift register illustrated in FIG. 7, it is pointed out that the re-occupying of the plurality of memory means takes place serially, based on the previous state of the memory means, which—considered as a whole—is shifted by one step to the left so that one state of the memory means 0 will "fall out" on the output side. This value "fallen out" is the number which will be output. The memory means no. 7 to the very right in FIG. 7 can be re-occupied by left-shifting the state of the entire memory means, considered as a whole. The plurality of memory means and, in particular, memory means 7 are thus reoccupied depending on an output of the feedback means at the current clock point in time.

Figure 9:
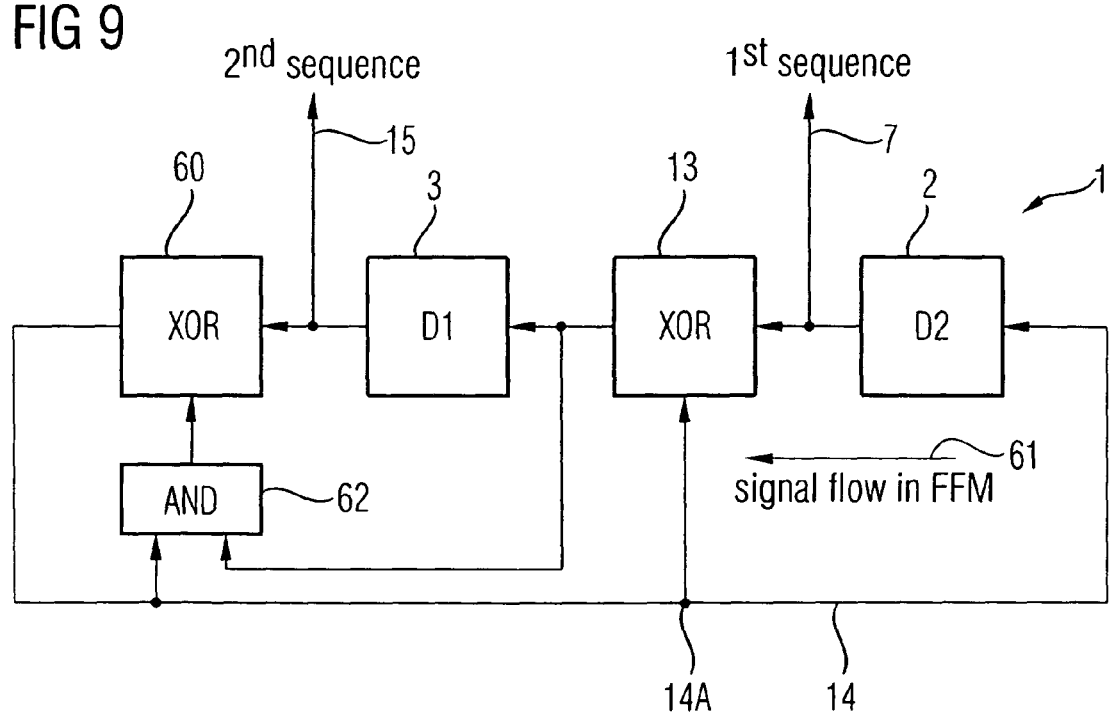
FIG. 9 shows an alternative setup for an elementary shift register having a non-linear feedback characteristic.

FIG. 9 shows an alternative embodiment where the alternative of the feedback means referred to by the reference numeral 14 in FIG. 6 is illustrated. In particular, the feedback means 14 in FIG. 9 is formed such that it does not have a variable feedback characteristic but a constant feedback characteristic. The inventive advantages are obtained by at least one control means 13 and preferably another control means 60 to be arranged in the feed forward means.

In the embodiment shown in FIG. 9, the control means 13 is controlled by a control signal directly derived from the feedback means 14. In the feed forward means shown in FIG. 9, only two memory means 2 and 3 are provided, the first control means 13 being connected between the memory cells 2 and 3, and the second control means 60 being connected between the memory cell 3 and (via the feedback means 14) the memory cell 2. Additionally, a signal flow is marked in FIG. 9 by an arrow 61 illustrating the signal flow in the feed forward means, which in the embodiment shown in FIG. 9 is from the right to the left hand side. A bit will at first enter the memory means D2. Thus, the bit stored in D2 will be output and forms a bit of the first sequence. At the same time, in the embodiment shown in FIG. 9, the bit output by the memory means 2 will be XOR-combined with a bit just present on the feedback means 14 to obtain a result bit clocked into the memory element 3 in the next cycle, at an output of the XOR combination. Thus, the bit just present in the memory element 3 will be clocked out of the memory element 3 and thus represents a bit of the second pseudo-random sequence of numbers. The bit at the output of the memory cell 3 is then XOR-combined with a control signal for the second control means 60, the control signal being generated from the signal at the feedback means 14 and the output signal of the first control means 13 by means of combining means. The combining means 62 preferably is a logic gate and, particularly in the embodiment shown in FIG. 9, an AND gate. The first sequence is output via an output 7, whereas the second sequence is output via an output 15. The two sequences output via the outputs 7 and 15 are really different and not only phase-shifted to each other.

To simplify the implementation of the XOR gate 60, another memory element is provided in another preferred embodiment downstream of the XOR gate 60 in the signal flow direction, wherein in this case a sequence, which is only phase-shifted to the first sequence at the output 7, but basically different from the second sequence at the output 15, will be output at the output of this memory element.

FIG. 10 shows an 8-bit elementary shift register having flip-flops D0-D7 connected in series, wherein second control means 60 is provided between the fourth and the third flip-flop, whereas first control means 13 is provided between the seventh and the sixth flip-flop. The first control means 13 is again directly supplied with the feedback signal on the feedback means 14, wherein the second control means 60 is supplied with the output signal of the AND gate 62 which in turn is supplied by the feedback means 14 on the one hand and the output signal of the fifth cell D5 on the other hand. In analogy to the embodiment shown in FIG. 9, the output sequence of the fourth cell D4 represents the second pseudo-random number sequence, whereas the output sequence of the seventh cell D7 represents the first random number sequence.

The embodiments shown in FIGS. 9 and 10 of an elementary shift register differ in that two more register cells D5, D6 are connected between the two control means and in that further memory cells D0-D3 are formed at the output of the XOR control means 60 so that another 8-bit shift register is formed. In one embodiment, a pseudo-random number sequence is tapped at the output of each memory cell D0-D7 and fed to combining means in order to achieve a particularly efficient pseudo-random number generator. In particular, the two sequences output by the cells D4 and D5 are shifted versions of the sequence output by the cell D6. Additionally, the four sequences output by the cells D2, D1, D0 and D7 are shifted versions of the sequence output by the cell D3. Thus, each sequence of the cells D7, D0, D1, D2, D3 is essentially different from a sequence of the cells D4, D5, D6.

It is to be pointed out that the starting state with which the shift register is initialized, i.e. the so-called seed, having been explained referring to FIG. 7, element 55, should be formed such that it includes at least one value unequal to zero for a memory element in order for the shift register to "get going" and not to output eight zero sequences at the eight outputs. Subsequently, when this condition is met, all the eight sequences have a maximum periodicity, i.e. a period length of 255. Furthermore, each of the eight sequences output has the maximum linear complexity 254 in the embodiment shown in FIG. 10. Additionally, as has already been explained, the two sequences output by the cells D3 and D6 are essentially different.

As can also be gathered from FIG. 10, memory cell D5 is the control cell. When the cell D5 contains a zero, the effect of the control means 60 between the cells D3 and D4 will be suppressed. Only the XOR between the cells D6 and D7 will be applied. If the cell D5, however, includes a 1, both XOR means 13 and 60 will be applied.

FIG. 11 shows a general feedback shift register having memory cells $D_0, \ldots, D_{n-1}$, having feed forward means and feedback means, referred to by $F(x_0, x_1, \ldots, x_{n-1})$.

A general n-stage (or n-cell) feedback shift register over the base element $GF(2)=\{0, 1\}$ is considered here. The shift register consists of n memory cells (flip-flops) $D_0, D_1 \ldots, D_{n-1}$ and the (electronical) realization of a feedback function $F(x_0, x_1, \ldots, x_{n-1})$. The feedback function associates to each n tuple consisting of n bits, a unique value from $GF(2)$, i.e. the value 0 or 1. In mathematical terminology, F is a function with a definition range $GF(2)^n$ and a target range $GF(2)$.

The shift register is controlled by an external clock. With each clock rate, the contents of the memory cell $D_j$ is shifted to the left neighboring cell $D_{j-1}$. $1 \leq j \leq n-1$. The contents of the memory cell $D_0$ is output. The contents of the memory cells $D_0, D_1, \ldots, D_{n-2}, D_{n-1}$ at a time t are given by $$s_t, s_{t+1}, \ldots, s_{t+n-2}, s_{t+n-1}.$$

Then, one clock rate later, i.e. at a time t+1, the memory cells will contain the following bits $$s_{t+1}, s_{t+2}, \ldots, s_{t+n-1}, s_{t+n},$$

wherein the value $s_{t+n}$ entering the cell $D_{n-1}$ is given by $$s_{t+n}, =F(s_t, s_{t+1}, \ldots, s_{t+n-1}).$$

Figure 12:
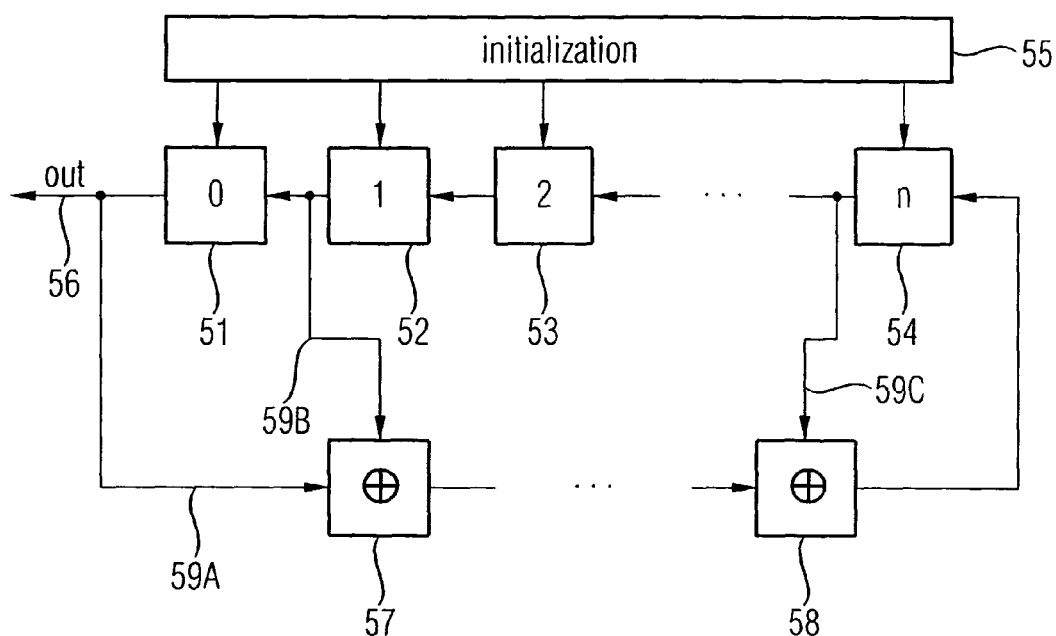
FIG. 12 shows a well-known linear shift register for generating a random number sequence.
Figure 13:
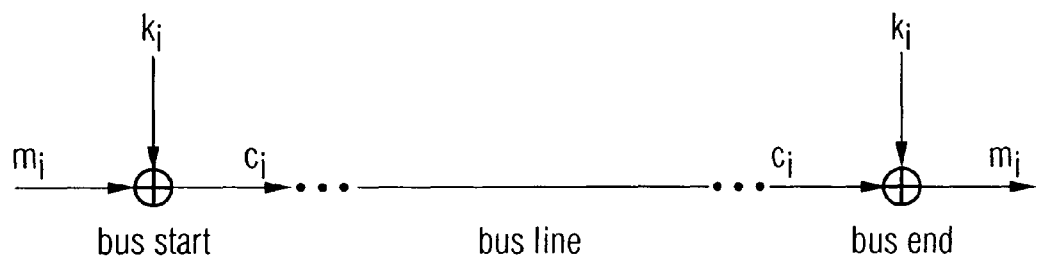
FIG. 13 shows a principle sketch of bus encryption.

The n tuple $(s_t, s_{t+1}, \ldots, s_{t+n-1})$ describes the state of the shift register at a time t. The n tuple $(s_0, s_1, \ldots, s_{n-1})$ is the starting state. FSR(F) is used as an abbreviation for the general feedback shift register having a feedback function F (FSR stands for feedback shift register). FIG. 12 shows a general feedback shift register.

The shift register outputs one bit with each clock of the external clock. In this way, the shift register can produce a periodical bit sequence $s_0, s_1, S_2, \ldots$, a so-called shift register sequence. $s_0, s_1, \ldots, s_{n-1}$ be the starting values of the shift register sequence. The feedback function $F(x_0, x_1, \ldots, x_{n-1})$ and the starting values $s_0, s_1, \ldots, s_{n-1}$ determine the shift register sequence completely. Since there are only $2^n$ different states for the shift register, the period length of the shift register sequence $s_0, s_1, s_2, \ldots$ will at most be $2^n$.

A general feedback shift register FSR(F) is called homogenous when its feedback function F is homogenous, i.e. if $F(0, 0, \ldots, 0))=0$ applies. A homogenous shift register put to the starting state $s_0, =s_1, = \ldots, =s_{n-1}=0$ will produce the zero sequence. It follows that the period length of the output sequence of an n-stage homogenous shift register may at most be $2^n-1$. When the period length takes the maximum value of $2^n-1$, the shift register sequence is called an M sequence and the shift register is maximal. It is an important object to find a maximal shift register.

Two special cases of the general feedback shift register FSR(F) are of particular interest. The case in which the feedback function F has the following form:

$$F(x_0, x_1, \ldots, x_{n-1}) = \sum_{0 \leq i \leq j \leq n-1} a_{ij} x_i x_j$$

will be considered, the coefficients $a_{ij}$ being either 0 or 1. In this case, this is called a square feedback function as an example of a non-linear feedback function and the designation square is also transferred to the shift register.

The other special case is when the feedback function F is linear. In this case, F has the following form:

$$F(x_0, x_1, \ldots, x_{n-1}) = a_0 x_0 + a_1 x_1 + \ldots + a_{n-1} x_{n-1},$$

wherein the coefficients $a_i$ are again either 0 or 1, i.e. elements from GF(2). In this case, this is called a linear or a linear feedback shift register and the abbreviation LFSR (linear feedback shift register) is used here. It is to be noted that both the linear feedback and the square feedback shift registers are homogenous.

An n-stage linear feedback shift register is usually characterized by a binary nth degree polynomial f(x) in a variable x. This polynomial f is called the characteristic polynomial of the linear feedback shift register. The shift register is then referred to as LFSR(f).

The feedback function $F(x_0, x_1, \ldots, x_{n-1})$ of a linear feedback shift register is a polynomial in n variables $x_0, x_1, \ldots, x_{n-1}$ and of degree 1. The characteristic polynomial f(x) of the same linear shift register, in contrast, is a polynomial of only one variable, i.e. the variable x, but of degree n. The following applies:

$$f(x) = x^n + F(1, x, x^2, \ldots, x^{n-1})$$

The non-linearity of the feedback function can thus be performed by relatively any forms of the feedback function F. It is principally sufficient here to only-multiply the output signals of two memory cells $D_i$ and $D_{i+1}$, from which a square shift register would form. More than two memory cell outputs may of course also be multiplied or subjected to any non-linear function. In principle, however, even a feedback with only one output signal of a single memory cell could be performed by, for example, only feeding back the output signal of the memory cell $D_0$, feeding it to the function $F(x_0)$ and feeding the output signal of this function for example into the memory cell $D_{n-1}$ on the input side. Such a non-linear function having only a single value would, for example, be an inversion, i.e. a logical NOT function. The non-linear function could, however, also be any other function, such as, for example, a non-linear association function or a cryptographic function.

Depending on the circumstances, the inventive method for generating random numbers may be implemented in either hardware or software. The implementation can be on a digital storage medium, in particular on a floppy disc or CD having control signals which can be read out electronically, which can cooperate with a programmable computer system such that the method will be executed. In general, the invention thus also includes a computer program product having a program code stored on a machine-readable carrier for performing the inventive method when the computer program product runs on a computer. Put differently, the invention can also be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A random number generator comprising:
 a plurality of memory cells arranged in a series;
 a feedback processor arranged to generate a feedback signal and to feed the feedback signal into one of the memory cells, wherein the feedback processor has a non-linear feedback characteristic; and
 a random number outputter arranged:
  to combine states of a first group of the memory cells comprising at least two memory cells, to obtain a first output sequence, and to combine states of a second group of memory cells comprising at least two memory cells, to obtain a second output sequence, the second group being different from the first group, or
  to combine states of a group of at least two memory cells according to a first combining rule to obtain a first output sequence, and to additionally combine the states of the group of memory cells according to a second combining rule to obtain a second output sequence, the second combining rule being different from the first combining rule.

2. The random number generator according to claim 1, wherein a number N of memory cells are provided, and wherein the random number outputter is arranged to generate a number M of output sequences, the number M being greater than the number N, and wherein the M output sequences differ from one another due to the underlying groups of memory cells or due to the underlying combining rules.

3. The random number generator according to claim 1, wherein the feedback processor comprises at least one AND gate arranged to AND-combine states of two of the memory cells, or wherein the feedback processor comprises at least one XOR gate arranged to XOR-combine states of two of the memory cells.

4. The random number generator according to claim 1, further comprising:
 a clock arranged to control the content of the memory cells wherein, a clock pulse produced by the clock causes a state in a memory cell arranged downstream in a processing direction to be fed into a memory cell arranged upstream in the processing direction, whereby a sequence of memory cell states results at an output of a memory cell responsive to a sequence of clock pulses.

5. The random number generator according to claim 1, wherein the feedback processor is coupled to the plurality of memory cells such that the feedback processor contains a state of a memory cell arranged upstream in the processing direction as an input and feeds the feedback signal into a memory cell arranged downstream in the processing direction.

6. The random number generator according to claim 1, wherein the plurality of memory cells operate as a shift register and, wherein the shift register and the feedback processor are non-linear and, wherein the shift register and the feedback processor together operate to generate a maximally periodic sequence.

7. The random number generator according to claim 1, wherein the number of memory cells is a prime number.

8. The random number generator according to claim 1, wherein the random number outputter comprises at least one logic gate arranged to combine states of a plurality of memory cells.

9. The random number generator according to claim 1, wherein the random number outputter is arranged to perform a modulo 2 addition on states of at least two memory cells.

10. The random number generator according to claim 1, wherein the random number outputter comprises an XOR gate arranged to combine states of memory cells.

11. The random number generator according to claim 1, wherein the feedback processor comprises:
   a first combiner arranged to combine states of memory cells to produce a first feedback characteristic;
   a second combiner arranged to combine states of memory cells to produce a second feedback characteristic; and
   a switch arranged to activate the first feedback characteristic in a first switching state and to activate the second feedback characteristic in a second switching state, the switch comprising a control input arranged to receive a control signal from an external control, whereby the switch is set to the first or the second switching state responsive to the control signal.

12. The random number generator according to claim 11, wherein the control signal has a control period duration, and wherein the random number generator further comprises:
   a clock arranged to control the content of the plurality of memory cells arranged in series, wherein the clock has a clock period duration, and wherein the clock period duration is smaller than the control period duration.

13. A bus encryption device comprising:
   a bus comprising a number N of parallel bus lines;
   for each of the bus lines, an encrypter or decrypter arranged to encrypt or decrypt a signal on the bus line using a key for the bus line;
   a random number generator comprising a plurality of memory cells arranged in a series;
   a feedback processor arranged to generate a feedback signal and to feed the feedback signal into one of the memory cells, wherein the feedback processor has a non-linear feedback characteristic; and
   a random number outputter, the random number outputter being formed to generate an output sequence for each of the bus lines by combining states of a group of memory cells and to feed the output sequence to the decrypter or encrypter for the bus line, the random number outputter being formed such that a group of memory cells differing from a group of memory cells provided for another bus line is provided for each of the bus lines.

14. A method for generating random numbers utilizing a random number generator, the random number generator comprising: (1) a plurality of memory cells arranged in a series, and (2) a feedback processor arranged to (a) generate a feedback signal, wherein the feedback processor has a non-linear feedback characteristic, and (b) to deliver the feedback signal to one of the memory cells, the method comprising:
   combining states of a group of at least two memory cells to obtain an output sequence and combining states of a second group of memory cells comprising at least two memory cells, to obtain a second output sequence, the second group being different from the first group, or
   combining states of a group of at least two memory cells according to a first combining rule to obtain a first output sequence, and combining the states of the group of memory cells according to a second combining rule to obtain a second output sequence, the second combining rule being different from the first combining rule.

15. A non-transitory computer readable storage medium having stored thereon a computer program comprising program code, the program code performing a method for generating random numbers with a random number generator, the random number generator comprising:
   a plurality of memory cells arranged in a series; and
   a feedback processor arranged to generate a feedback signal, and to feed the feedback signal into one of the memory cells, wherein the feedback processor has a non-linear feedback characteristic,
   the computer program operating to:
      combine states of a first group of at least two memory cells to obtain an output sequence, and to combine states of a second group of memory cells comprising at least two memory cells, to obtain a second output sequence, the second group being different from the first group, or
      combine states of a group of at least two memory cells according to a first combining rule to obtain a first output sequence, and combine the states of the group of memory cells according to a second combining rule to obtain a second output sequence, the second combining rule differing from the first combining rule,
   when the computer program runs on a computer.

16. A random number generator comprising:
   means for controlling a plurality of memory cells arranged in a series;
   feedback means comprising means for generating a first feedback signal, and means for feeding delivering the feedback signal into to one of the plurality of memory cells, wherein the feedback means has a non-linear feedback characteristic; and
   means for:
      combining states of a first group of at least two memory cells to obtain an output sequence and combining states of a second group of memory cells comprising at least two memory cells, to obtain a second output sequence, the second group being different from the first group, or
      combining states of a group of at least two memory cells according to a first combining rule to obtain a first output sequence, and combining the states of the group of memory cells according to a second combining rule to obtain a second output sequence, the second combining rule differing from the first combining rule.

17. The random number generator according to claim 16, further comprising:
   means for generating a second feedback signal; and
   means for selecting a feedback signal selected from the group comprising first and second feedback signals.

* * * * *